United States Patent
Weber et al.

(10) Patent No.: US 10,983,265 B2
(45) Date of Patent: Apr. 20, 2021

(54) TOUCHSCREEN HAVING A HAPTIC FEEDBACK DEVICE

(71) Applicant: Continental Automotive GmbH, Hannover (DE)

(72) Inventors: Markus Weber, Mainz (DE); Andreas Brüninghaus, Wiehl (DE); Steffen Wildner, Dieburg (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 315 days.

(21) Appl. No.: 16/006,244

(22) Filed: Jun. 13, 2018

(65) Prior Publication Data

US 2018/0292601 A1    Oct. 11, 2018

Related U.S. Application Data

(63) Continuation of application No. PCT/EP2016/080581, filed on Dec. 12, 2016.

(30) Foreign Application Priority Data

Dec. 17, 2015 (DE) ..................... 10 2015 225 722.3

(51) Int. Cl.
| | |
|---|---|
| *F21V 8/00* | (2006.01) |
| *G06F 3/01* | (2006.01) |
| *G06F 3/041* | (2006.01) |
| *G02F 1/13357* | (2006.01) |
| *G02F 1/1333* | (2006.01) |

(52) U.S. Cl.
CPC ......... *G02B 6/0085* (2013.01); *G02B 6/0091* (2013.01); *G02F 1/13338* (2013.01); *G02F 1/133615* (2013.01); *G06F 3/016* (2013.01); *G06F 3/041* (2013.01)

(58) Field of Classification Search
CPC ..... G02B 6/0085; G02B 6/0091; G06F 3/016; G06F 3/041; G02F 1/133615; G02F 1/13338
See application file for complete search history.

(56) References Cited

U.S. PATENT DOCUMENTS 7,513,661 B2* 4/2009 Hamada ............... G02B 6/0036
                                                        362/294
2008/0055277 A1   3/2008 Takenaka et al.
(Continued)

FOREIGN PATENT DOCUMENTS

| CN | 1971352 A | 5/2007 |
|---|---|---|
| CN | 102349035 A | 2/2012 |

(Continued)

OTHER PUBLICATIONS

Search Report dated Jun. 23, 2016 from corresponding German Patent Application No. 10 2015 225 722.3.

(Continued)

*Primary Examiner* — Thomas M Sember

(57) ABSTRACT

A touchscreen having a haptic feedback device includes an electrooptical display with an input area located in front of the electrooptical display and a carrier. The display is mechanically connected, rigidly, to the input area. The input area is movable relative to the carrier by a motor. The electrooptical display is illuminated by a light source connected immovably to the carrier.

10 Claims, 3 Drawing Sheets

(56) References Cited

U.S. PATENT DOCUMENTS

| | | | |
|---|---|---|---|
| 2010/0090814 A1 | 4/2010 | Cybart et al. | |
| 2011/0193802 A1 | 8/2011 | Park et al. | |
| 2013/0278561 A1 | 10/2013 | Yokoyama | |
| 2015/0205443 A1 | 7/2015 | Gruhlke et al. | |
| 2015/0253934 A1 | 9/2015 | Lin et al. | |

FOREIGN PATENT DOCUMENTS

| | | |
|---|---|---|
| CN | 102937846 A | 2/2013 |
| CN | 102981665 A | 3/2013 |
| CN | 103154857 A | 6/2013 |
| CN | 104006357 A | 8/2014 |
| CN | 104251443 A | 12/2014 |
| CN | 104503615 A | 4/2015 |
| CN | 204347802 U | 5/2015 |
| CN | 104685444 A | 6/2015 |
| CN | 104898406 A | 9/2015 |
| CN | 104969158 A | 10/2015 |
| EP | 2073103 A1 | 6/2009 |
| KR | 20120070418 A | 6/2012 |
| WO | 2012090031 A1 | 7/2012 |
| WO | 2015/036045 A1 | 3/2015 |

OTHER PUBLICATIONS

International Search Report and Written Opinion dated Feb. 17, 2017 from corresponding International Patent Application No. PCT/EP2016/080581.
Chinese Office Action dated Jun. 22, 2020 for the counterpart Chinese Patent Application No. 201680067647.3.
Chinese Notice of Allowance dated Jan. 28, 2021 for the corresponding Chinese Patent Application 201680067647.3.

\* cited by examiner

TOUCHSCREEN HAVING A HAPTIC FEEDBACK DEVICE

BACKGROUND

The invention relates to a touchscreen having a haptic feedback device. The prior art discloses such touchscreens, which comprise an electrooptical display with an input area, arranged in front of the electrooptical display, and a carrier. The electrooptical display is mechanically connected rigidly to the input area and designed to be movable in relation to the carrier by means of a motor. A liquid crystal display or some other transmissive display may be used for example as the electrooptical display. The movement of the input area has the effect of producing haptic feedback for a user of the input area who touches the input area. The movement of the input area may take place for example in a perpendicular or parallel direction in relation to the surface of the input area. However, composite movements of the two aforementioned movements are also possible. Usually, the distance that the input area covers in relation to the carrier is less than 1 mm to a few millimeters. The frequency of the movement may be a few hertz to several kilohertz. In the prior art, the electrooptical display can be illuminated by means of an illuminating device, this illuminating device comprising a light source. In the prior art, it is known on the one hand to connect the electrooptical display rigidly to the illuminating device. In particular in the case of spatially larger touchscreens, it is necessary to dimension the illuminating device correspondingly. Thus, a great amount of light is required to be able to illuminate the touchscreen satisfactorily. The illuminating devices required for this have appreciable masses. These additional masses make the mechanical design of the movable display area in relation to the carrier and of the motor required for this very complex. It is therefore also known from the prior art to arrange the input area at a distance from the electrooptical display and only to move the input area by means of the motor. A disadvantage here is the air gap that inevitably exists between the input area and the electrooptical display, so that undesired, disturbing reflections occur due to the transitions from the input area into the air gap and from the air gap into the electrooptical display. The object of the invention is therefore to provide a touchscreen having a haptic feedback device which on the one hand has good optical properties and which on the other hand requires a mechanism that is not too complex for the relative movement between the input area and the carrier.

SUMMARY

This object is achieved by the light source being connected immovably to the carrier. In particular if the light source requires a heat sink in order to dissipate excess thermal energy, a considerable saving in the mass to be moved is thereby achieved, without impairing the optical properties of the touchscreen.

If the input area is adhesively bonded to the electrooptical display, particularly good optical properties of the touchscreen are produced, in particular if a so-called optical bonding compound is used as the adhesive. Such adhesives contain for example transparent silicones or acrylates. If the input area consists of glass, a silicone adhesive is advantageous in particular, since it has virtually the same optical properties as glass.

If the light source comprises a light-emitting diode, a large part of the energy that is electrically supplied to the light-emitting diode is converted into light. Thus, firstly less energy is required and secondly only little energy loss has to be dissipated. However, other light sources, such as for example incandescent lamps or fluorescent lamps, are also possible as light sources.

If the light source is rigidly connected to a light guide and the light guide is designed to couple in light of the light source and to couple out the coupled-in light into the electrooptical display directly or by way of at least one light management film and/or by way of an air gap, the required moved masses can be reduced further. It is possible to dispense with an air gap in particular whenever the input area is designed to be movable parallel to its surface, and thus there is no change in the distance between the light guide and the electrooptical display.

If the illuminating device is designed to couple light into the light guide, the light guide being rigidly connected to the electrooptical display and the light guide being designed to couple light into the electrooptical display, good uniform illumination of the electrooptical display is achieved without the mass that has to be moved being increased significantly, since the light guide can have a small thickness, and consequently a small mass.

In the case of all the aforementioned designs, so-called light management films can still be used between the light guide and the electrooptical display, in order to be able to ensure still more uniform distribution of the light if the desired light distribution cannot be accomplished by the light guide alone.

If the carrier is designed as a housing, the touchscreen can be easily protected from undesired contamination within the housing.

If a seal is arranged between the housing and the electrooptical display, contamination of the interior space of the touchscreen can be prevented even better.

If the seal is designed as a light guide, this component can both seal the housing and guide the light from the light source to a light guide that is present.

If the seal is elastically designed, it can be easily created. However, it is also possible for example to provide a seal in the form of interengaging slotted links that are arranged displaceably with respect to one another.

If the input area is curved, a particularly high-quality look of the touchscreen is accomplished. Furthermore, insertion for example in a central console of a motor vehicle is easier in terms of design and can be accomplished more attractively.

If, in addition to the input area, the electrooptical display is also curved, an undistorted representation and information on the electrooptical display can be accomplished more easily.

BRIEF DESCRIPTION OF THE FIGURES

The invention will be explained in more detail below on the basis of the figures, in which.

DETAILED DESCRIPTION

Figure 1:
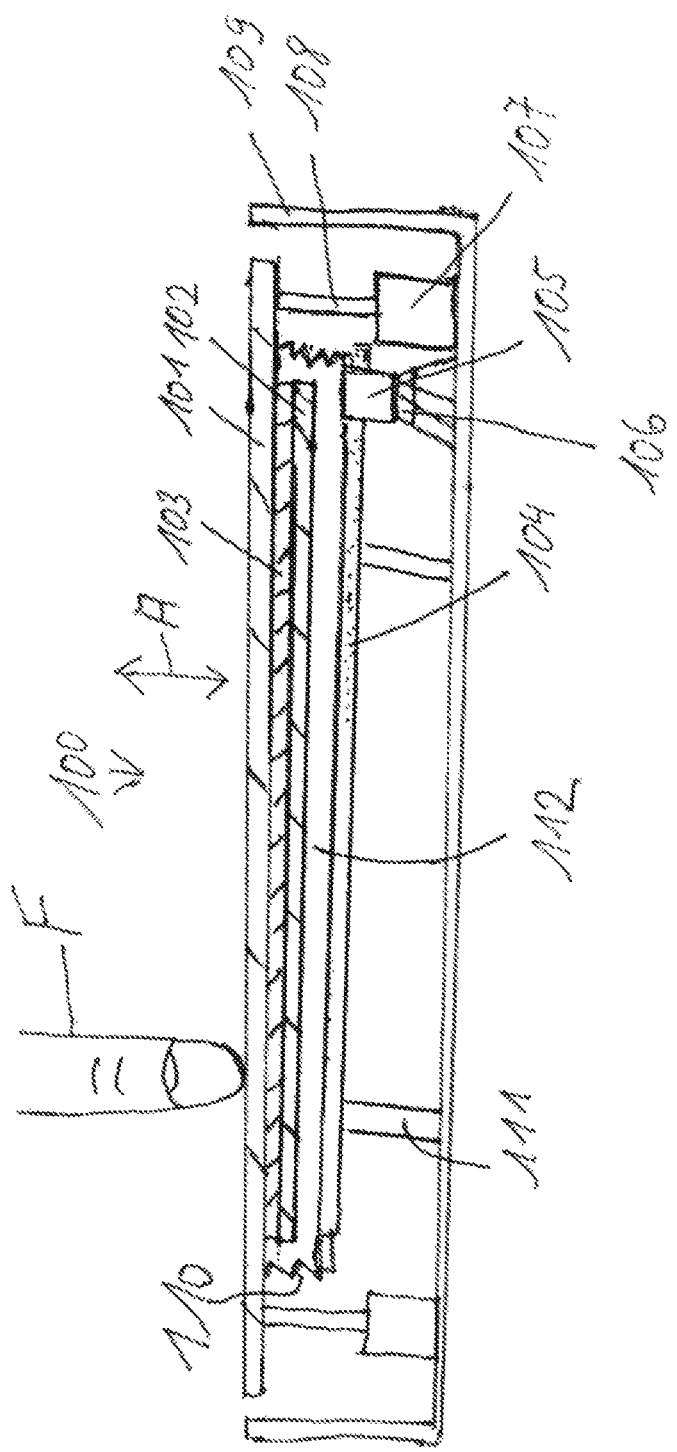
FIG. 1 shows a cross section through a first particularly preferred exemplary embodiment of a touchscreen according to the invention

In FIG. 1 there can be seen an exemplary embodiment of a touchscreen 100 according to the invention, which comprises an input area 101, an electrooptical display 102, an adhesive bond 103, a light guide 104, a light source 105 in the form of a light-emitting diode, a heat sink 106, two motors 107, two connections 108, a carrier 109 in the form of a housing, two seals 110, two connecting elements 111 and an air gap 112. Part of a finger F of a user of the touchscreen according to the invention, who is not otherwise represented, and a double-headed arrow A can also be seen. The input area 101 is connected to the electrooptical display 102 by means of the adhesive bond 103. This adhesive bond may be designed in particular in the form of an optical bonding. The light guide 104 is rigidly connected to the carrier 109 by way of the connecting elements 111, and similarly the light source 105 is rigidly connected to the carrier 109 by way of the heat sink 106. Light of the light source 105 is coupled into the light guide 104 and is coupled out from it in the direction of the electrooptical display 102. Between the light guide 104 and the electrooptical display 102 there may also be in FIG. 1 so-called light management films, in order if appropriate to further improve distribution of the light. The seals 110 prevent contamination from occurring, in particular in the region of the air gap 112. The motors 107 move the input area 101 by way of the connections 108 in a direction perpendicular to the surface of the input area 101, as represented by the double-headed arrow A. This movement has the effect of producing tactile feedback in the finger F of a user of the touchscreen 100.

Figure 2:
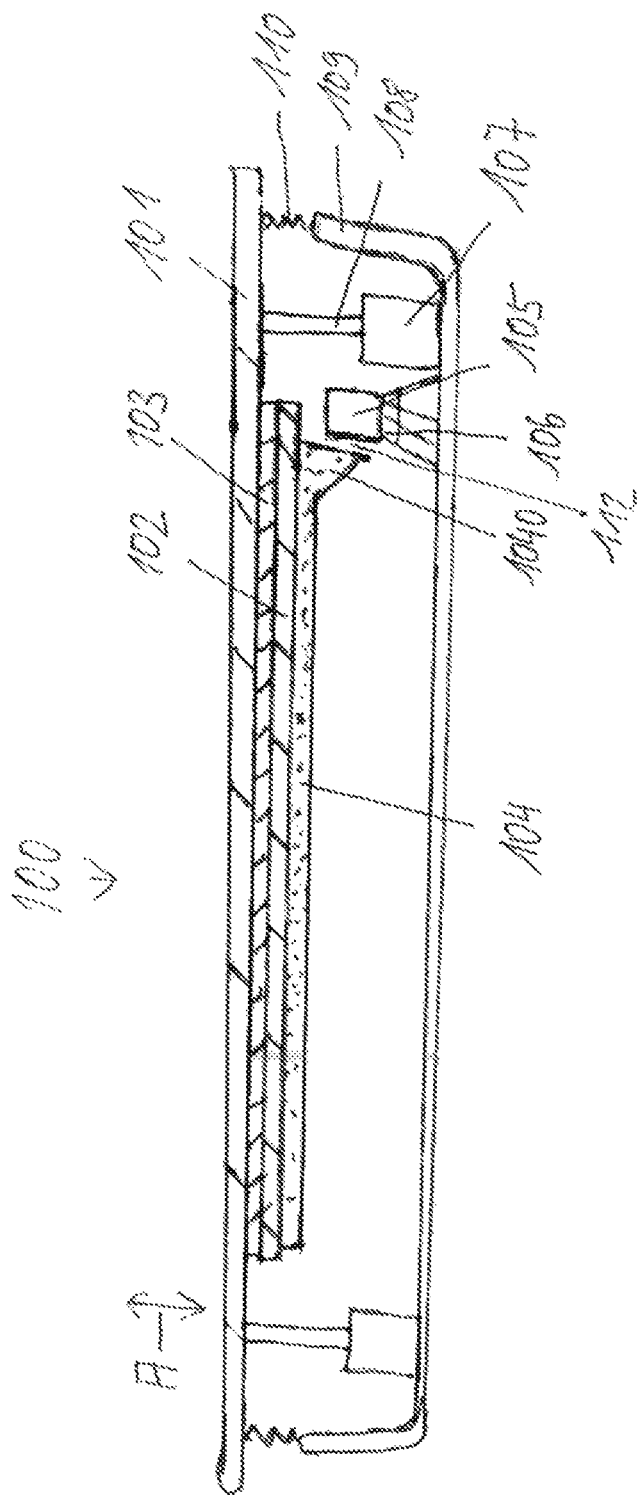
FIG. 2 shows a cross section through a second particularly preferred exemplary embodiment of a touchscreen according to the invention

With respect to the invention, the touchscreen 100 in FIG. 2 mainly differs from the touchscreen represented in FIG. 1 in that the light guide 104 is fastened directly on the electrooptical display 102, for example by adhesive bonding. In the case of the exemplary embodiment in FIG. 1, the light source 105 is likewise rigidly connected to the carrier 109 by way of the heat sink 106. It is also possible to connect the light source 105 to the carrier 109 differently, for example directly to the carrier 109 or else on a printed circuit board that is not represented, which is fixedly connected to the carrier 109, and either to omit the heat sink or, if its cooling performance is required, to provide the heat sink to the side or above the light source 105. The light guide 104 comprises a particular not coupling-in region 1040, into which the light of the light source 105 can be coupled independently of the currently assumed position of the input area 101, and consequently also of the light guide 104. In the exemplary embodiment according to Figure two, there is an air gap 112 between the coupling-in region 1040 and the light source 105. If the movement of the input area 101 by the motors 107 and the corresponding guidance are designed to be correspondingly exact, it is possible to dispense with the air gap 112. The exemplary embodiment in FIG. 2 also differs from the exemplary embodiment in FIG. 1 in that the input area 101 completely covers the carrier 109 in the form of a housing, so that an observer of the touchscreen cannot see the carrier 109, and thus a more high-quality impression of the touchscreen 100 is produced. The seals 110 are arranged between the carrier 109 and the input area 101.

Figure 3:
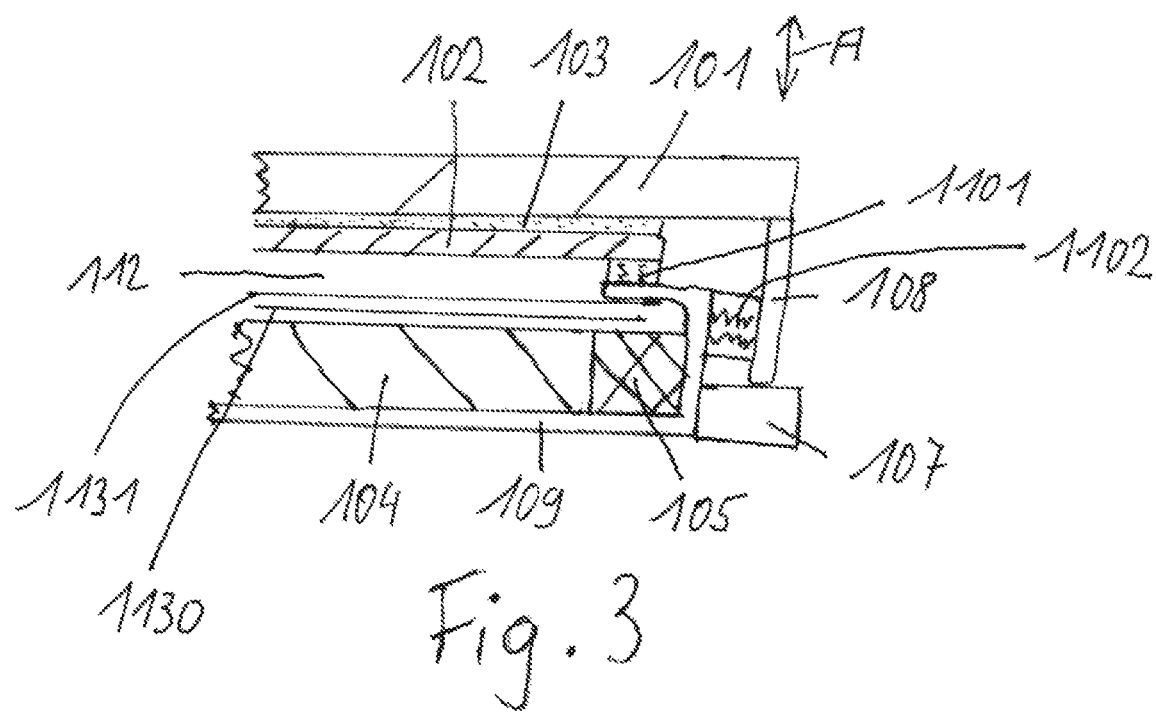
FIG. 3 shows a partial cross section through an exemplary embodiment of a touchscreen according to the invention with particularly preferred seals.

In FIG. 3, part of the input area 101, part of the electrooptical display 102, part of the adhesive bond 103, part of the light guide 104, the light source 105, a motor 107, a connection 108, a carrier 109, a seal 1101, a seal 1102 and two light management films 1130,131 can be seen. The light guide 104 and the light source 105 are arranged and fastened directly on the lower part of the carrier 109; a heat sink for the light source 105 has not been provided. The light management films 1130, 1131 are arranged on the light guide 104, between the air gap 112 and the light guide 104. One seal 1101 consists of a foam-like film which is elastically more compressed in the normal direction, and one seal 1102 consists of a foam-like film which is elastically more compressed in the lateral direction.

The invention can also be used in a touchscreen in the case of which the movement of the input area is designed to be parallel to its surface. This must then be taken into account when transmitting the light from the light source into the electrooptical display by way of the light guide. It is also possible in the case of this design either to fasten the light guide directly on the electrooptical display, and consequently also move it during the movement of the input area, or else to rigidly connect the light guide directly or indirectly to the carrier, and then if appropriate couple the light into the electrooptical display by way of an air gap.

In the case of all the designs, one or more light management films may be arranged between the light guide and the electrooptical display in order also to additionally make the distribution of the light more uniform if, due to a corresponding design of the light guide, such as for example roughenings, angled-away portions occurring in the light guide or foreign bodies, for example micro air bubbles or other micro particles, introduced into the light guide.

The invention claimed is:

1. A touchscreen having a haptic feedback device comprising:
    an electrooptical display with an input area arranged in front of the electrooptical display and a carrier, the electrooptical display being mechanically connected rigidly to the input area and the input area being designed to be movable in relation to the carrier by a motor, the electrooptical display being able to be illuminated by means of an illuminating device, the illuminating device comprising a light source connected immovably to the carrier;
    wherein the light source is rigidly connected to a light guide and the light guide is configured to couple in, light of the light source and to couple out, the coupled-in light into the electrooptical display directly; and
    wherein the illuminating device is configured to couple light into the light guide, and wherein the light guide is rigidly connected to the electrooptical display and the light guide is configured to couple out, light into the electrooptical display directly.

2. The touchscreen of claim 1, wherein the input area is adhesively bonded to the electrooptical display.

3. The touchscreen of claim 2, wherein the light source is thermally coupled to a cooling device.

4. The touchscreen of claim 3, wherein the light source comprises a light-emitting diode.

5. The touchscreen of claim 1, wherein the carrier is a housing.

6. The touchscreen of claim 5, further comprising a seal between the housing and the electrooptical display.

7. The touchscreen of claim 6, wherein the seal is a light guide.

8. The touchscreen of claim 7, wherein the seal is elastic.

9. The touchscreen of claim 8, wherein the input area is curved.

10. The touchscreen of claim 9, wherein the electrooptical display is curved.

* * * * *